US008948461B1

(12) United States Patent
Broadhurst et al.

(10) Patent No.: US 8,948,461 B1
(45) Date of Patent: Feb. 3, 2015

(54) METHOD AND SYSTEM FOR ESTIMATING THE THREE DIMENSIONAL POSITION OF AN OBJECT IN A THREE DIMENSIONAL PHYSICAL SPACE

(75) Inventors: Adrian E. Broadhurst, Pittsburgh, PA (US); John P. MacCormick, Mountain View, CA (US); Donald O. Tanguay, Jr., Sunnyvale, CA (US); Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 11/119,179

(22) Filed: Apr. 29, 2005

(51) Int. Cl.
*G06K 9/00* (2006.01)

(52) U.S. Cl.
CPC .................. *G06K 9/00201* (2013.01)
USPC ............................. 382/106; 382/118; 382/154

(58) Field of Classification Search
CPC ..... G06T 17/10; G06T 7/0059; G06T 7/0065; G06T 2200/08; G06K 9/00201; G06K 9/00288
USPC .......................... 382/154, 103, 107, 190, 106; 348/14.13, 584; 345/634, 757
See application file for complete search history.

(56) References Cited

U.S. PATENT DOCUMENTS

| | | | |
|---|---|---|---|
| 5,852,669 A * | 12/1998 | Eleftheriadis et al. | 382/118 |
| 6,411,744 B1 * | 6/2002 | Edwards | 382/294 |
| 6,456,300 B1 * | 9/2002 | Pettigrew | 345/634 |
| 6,944,320 B2 * | 9/2005 | Liu et al. | 382/118 |
| 7,130,446 B2 * | 10/2006 | Rui et al. | 382/103 |
| 7,142,726 B2 * | 11/2006 | Ziegler et al. | 382/285 |
| 7,171,025 B2 * | 1/2007 | Rui et al. | 382/103 |
| 7,212,664 B2 * | 5/2007 | Lee et al. | 382/154 |
| 7,221,809 B2 * | 5/2007 | Geng | 382/280 |
| 7,317,830 B1 * | 1/2008 | Gordon et al. | 382/173 |
| 7,324,594 B2 * | 1/2008 | Lamboray et al. | 375/240.03 |
| 7,336,296 B2 * | 2/2008 | Brown et al. | 348/139 |
| 7,421,098 B2 * | 9/2008 | Bronstein et al. | 382/118 |
| 7,620,202 B2 * | 11/2009 | Fujimura et al. | 382/103 |

(Continued)

FOREIGN PATENT DOCUMENTS

WO WO 2004/111687 * 12/2004

OTHER PUBLICATIONS

Adnan M. Alattar and Sarah A. Rajala "Estimating Head's Measurements From Front-View Head and Shoulders Images" IEEE 1999, p. IV-114-IV-117.*

(Continued)

*Primary Examiner* — Mekonen Bekele
(74) *Attorney, Agent, or Firm* — Murabito, Hao & Barnes, LLP; William A. Zarbis

(57) ABSTRACT

A method and system for estimating the three dimensional position of an object in a three dimensional physical space. Specifically, the method discloses capturing a plurality of images of a human form within the three dimensional (3D) physical space. Each of the plurality of images is captured from a different viewpoint location of the human form. At least one image capturing device calibrated within the 3D physical space is used to capture the images. A plurality of silhouettes of the human form is extracted from the plurality of images. A plurality of contours of an object of the human form is obtained from the plurality of silhouettes. A location of the object within the 3D physical space is determined from an object model of the object based on the plurality of contours.

33 Claims, 16 Drawing Sheets

(56) References Cited

U.S. PATENT DOCUMENTS

| | | | |
|---|---|---|---|
| 7,848,548 B1* | 12/2010 | Moon et al. | 382/118 |
| 2004/0151356 A1* | 8/2004 | Li et al. | 382/131 |
| 2004/0240711 A1* | 12/2004 | Hamza et al. | 382/118 |
| 2005/0008196 A1* | 1/2005 | Liu et al. | 382/107 |
| 2005/0031194 A1* | 2/2005 | Lee et al. | 382/154 |
| 2005/0031196 A1* | 2/2005 | Moghaddam et al. | 382/154 |
| 2005/0047630 A1* | 3/2005 | Liu et al. | 382/118 |
| 2005/0053275 A1* | 3/2005 | Stokes | 382/154 |
| 2005/0152579 A1* | 7/2005 | Park et al. | 382/103 |
| 2005/0259873 A1* | 11/2005 | Sung et al. | 382/195 |
| 2011/0069866 A1* | 3/2011 | Kim et al. | 382/103 |
| 2011/0102553 A1* | 5/2011 | Corcoran et al. | 348/50 |

OTHER PUBLICATIONS

Adnan M. Alattar and Sarah A. Rajala "Estimating Head's Measurements From Front-View Head and Shoulders Images" IEEE 1999, p. IV-114 to IV-117.*

Qiang Ji and Rong Hu "3D Face pose estimation and tracking from a monocular camera" Image and Vision computing 2002, p. 1-13, Pub. Jan. 2002.*

Sangho Park and J. K. Aggarwal, "Head Segmentation and Head Orientation in 3D space for Pose Estimation of Multiple People" IEEE, 2000, p. 192-196.*

* cited by examiner

METHOD AND SYSTEM FOR ESTIMATING THE THREE DIMENSIONAL POSITION OF AN OBJECT IN A THREE DIMENSIONAL PHYSICAL SPACE

TECHNICAL FIELD

The various embodiments of the present invention relate to head tracking. More specifically, various embodiments of the present invention relate to the determination of head position based on silhouettes of the subject derived from one or more calibrated cameras.

BACKGROUND

Head tracking has many uses in computer assisted programs. For instance, head tracking is useful for integration of a user into a virtual environment. This is particularly the case when a user is participating within a three dimensional (3D) gaming environment. Tracking of the user's head provides visual cues as to what viewpoint is projected in the 3D environment. Moreover, simulations that mimic real-time scenarios (e.g., for training) may require the use of head tracking equipment to determine the user's interaction within the simulation. Various other uses have need for determining the 3D location of a user's head.

Numerous techniques can be used for 3D head tracking. These techniques suffer from various disadvantages, or flaws, some of which are listed below. For example, some techniques required the use of markings on a head that could be tracked. Other techniques required the wearing of LED lights on various positions around the head to held determine the 3D position of the head. These two techniques required additional active measures to be taken by the user in order to implement 3D head tracing. While these techniques require the use of external markings on the user's head, other techniques require that facial features are extracted from images of the user in order to reliably track the 3D position of the user's head. Extraction of facial features is computationally expensive and may require specialized equipment. Still other techniques require that a complete 3D model of the user's head be generated in order to track the position of the user's head in 3D space. This technique also is computationally expensive. Other techniques require the computation of optical flow, or some essentially equivalent quantity, such as the registration of textures. However, these techniques are not invariant to lighting. Still other techniques require explicit stereo information, which relies on matching of features between views.

In general, all of these techniques are computationally expensive, and/or require expensive equipment to implement. As a result, these techniques are not robust. That is, these techniques as a group are vulnerable to various difficulties and may not be able to operate in real-time. For example, these techniques as a group are vulnerable to one or more of the following: changes in lighting; the appearance and disappearance of the user; difficulties in finding features that can be tracked reliably; inaccuracies in forming an explicit 3D model of the user's head; and problems with inaccurate calculation of optical flow and/or texture registration.

SUMMARY

A method and system for estimating the three dimensional position of an object in a three dimensional physical space. Specifically, the method discloses capturing a plurality of images of a human form within the three dimensional (3D) physical space. Each of the plurality of images is captured from a different viewpoint location of the human form. At least one image capturing device calibrated within the 3D physical space is used to capture the images. A plurality of silhouettes of the human form is extracted from the plurality of images. A plurality of contours of an object of the human form is obtained from the plurality of silhouettes. A location of the object within the 3D physical space is determined from an object model of the object based on the plurality of contours.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Figure 1:
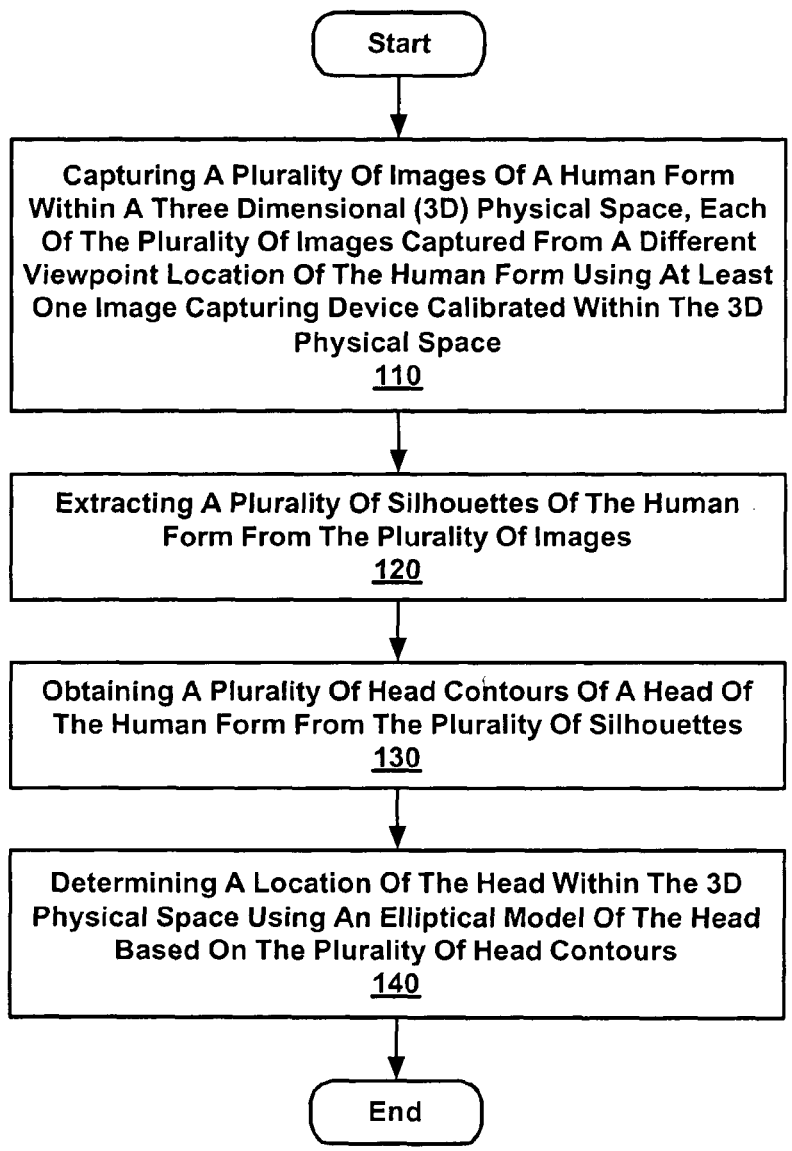
FIG. 1 is a flow chart illustrating steps in a computer implemented method for estimating the three dimensional position of an object in three dimensional physical space, in accordance with one embodiment of the present invention.

Reference will now be made in detail to embodiments of the present invention, a method and system for determining the three dimensional position of a head of a user in three dimensional (3D) physical space, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for estimating the three dimensional position of an object in 3D space, and can be implemented on a computer readable medium. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "capturing," or "extracting," or "obtaining," or "determining," or "estimating," or "calculating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for estimating the three dimensional position of a head of a user in 3D physical space. Specifically, embodiments of the present invention are capable of determining the 3D position of a user's head in real time, based on silhouettes of the user derived from two or more calibrated cameras. Other embodiments of the present invention serve the above purpose and provide this estimation passively without requiring markings to be placed on the user, or without requiring the user to wear specialized head gear for tracking the position of the head of the user. Still other embodiments of the present invention serve the above purposes and further provide increased accuracy as well as computational efficiency. Moreover, still other embodiments of the present invention serve the above purposes and further provide increased robustness because of the use of silhouettes and ellipsoids for matching the silhouettes. As such, embodiments of the present invention are not vulnerable to changes in lighting, the appearance and disappearance of the user, difficulties in finding features that can be tracked reliably, inaccuracies in forming an explicit 3D model of the user's head, and problems with inaccurate calculation of optical flow and/or texture registration.

Multicamera Head Tracking from Silhouettes

FIG. 1 is a flow chart illustrating steps in a computer implemented method for estimating the three dimensional position of an object in 3D physical space. Specifically, embodiments of the present invention are capable of determining the 3D position of a user's head in real time, based on silhouettes of the user derived from two or more calibrated cameras. For purposes of illustration only, embodiments of the present invention are directed to tracking the head of a person, hereinafter referred to as the user of the system.

While embodiments of the present invention refer to the extraction of a head of a user, other embodiments of the present invention are well suited to determining the position of any object in three dimensional space, as well as determining the position of a head of any non-human subject in three dimensional space.

At 110, the present embodiment captures a plurality of images of a human form within a three dimensional (3D) physical space. The human form is the user of which the position of its head is determined. The human form is hereinafter referred to as the user. Each of the plurality of images is captured from a different viewpoint location. That is, images of the user is taken from varying viewpoints.

Figure 2A:
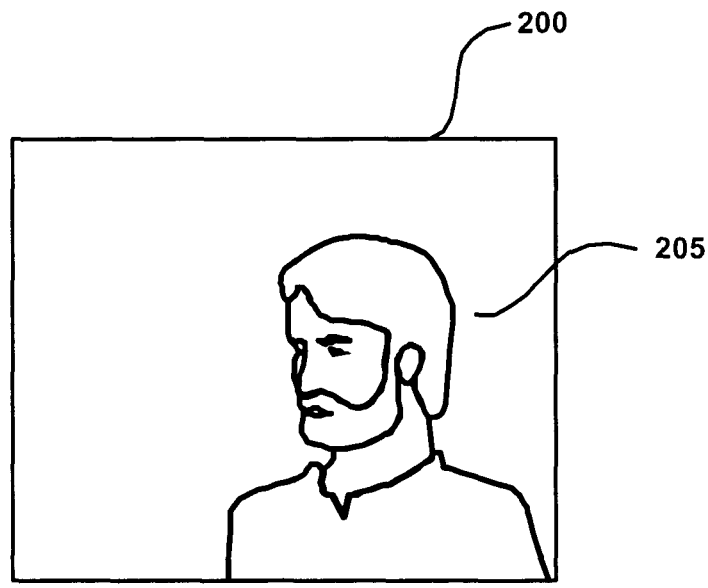
FIG. 2A is an illustration of an image taken of an object in three dimensional physical space including the background, in accordance with one embodiment of the present invention.

FIG. 2A provides an illustration of an image 200 taken of a user 205 in three dimensional physical space including the background, in accordance with one embodiment of the present invention. For example, the background includes some equipment, as seen to the left of the user 205 in the image 200, and a wall directly behind the user 205. The image 200 is taken from one viewpoint of the user in the 3D physical space.

The plurality of images is taken using at least one image capturing device calibrated within the 3D physical space. Calibration of each image capturing device determines the positions of each of the image capturing devices within the 3D physical space, and may be used for removing the background from the foreground of the image. For example, the performance of the calibration stage determines both intrinsic and extrinsic camera parameters for each of the image capturing devices. Intrinsic parameters are internal to each camera and include a quantification of the lens distortion parameters, focal length, field of view, aspect ratio, and color sensitivity. Extrinsic parameters include the camera pose, which is the orientation and position of each camera acquisition module in relation to the local participant.

At 120, the present embodiment extracts a plurality of silhouettes of the user from the plurality of images. Embodiments of the present invention extract silhouettes of the user rather than using raw video. These silhouettes could be obtained by background removal (assuming a static background), depth segmentation (assuming depth information, for example from a stereo rig), or any other appropriate technique for silhouette extraction. For instance, in one embodiment the silhouettes are derived in part from foreground extraction based on depth imagery. In another embodiment, the silhouettes are derived in part from information related to scene motion (including frame differencing).

Figure 2B:
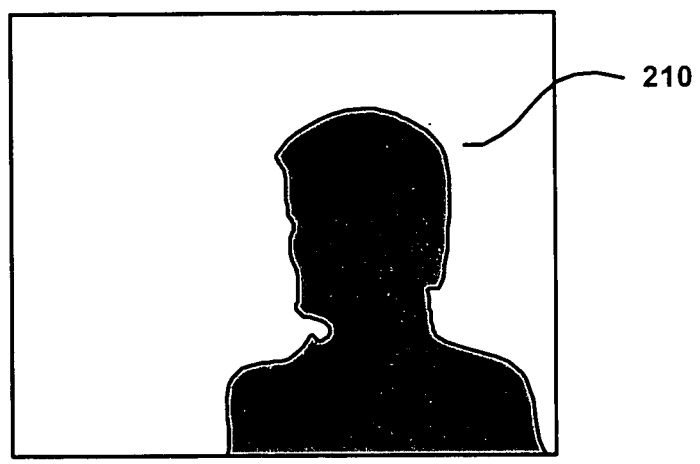
FIG. 2B is an illustration of a silhouette extracted from the image of FIG. 2A, in accordance with one embodiment of the present invention.

FIG. 2B is an illustration of a silhouette 210 extracted from the image 200 of FIG. 2A, in accordance with one embodiment of the present invention. In one embodiment, background removal is performed on each of plurality of images in order to extract the silhouette of the user. For instance, background removal may be performed on the image 200 of FIG. 2A in order to extract the silhouette 210 of FIG. 2B. Many methods for background removal, are known in the art of computer vision.

At 130, the present embodiment obtains a plurality of head contours of a head of the user from the plurality of silhouettes. As such, a vertical threshold is performed on each of the plurality of silhouettes. As a result, embodiments of the present invention do not utilize the entire silhouette that is extracted, but rather an extracted part of the silhouette known to correspond to the user's head, hereinafter referred to as the "head contour." That is, portions of the silhouette above the vertical threshold correspond to the head contour.

Additionally, the head contour need not consist of all parts of the silhouette that correspond to the user's head. Embodiments of the present invention are well suited to determining the position of the user's head when given head contours that are extracted from only a subset of the user's head. However, better performance of determining the position of the head can be realized if the head contour is extracted from a substantial subset of the user's head.

Figure 2C:
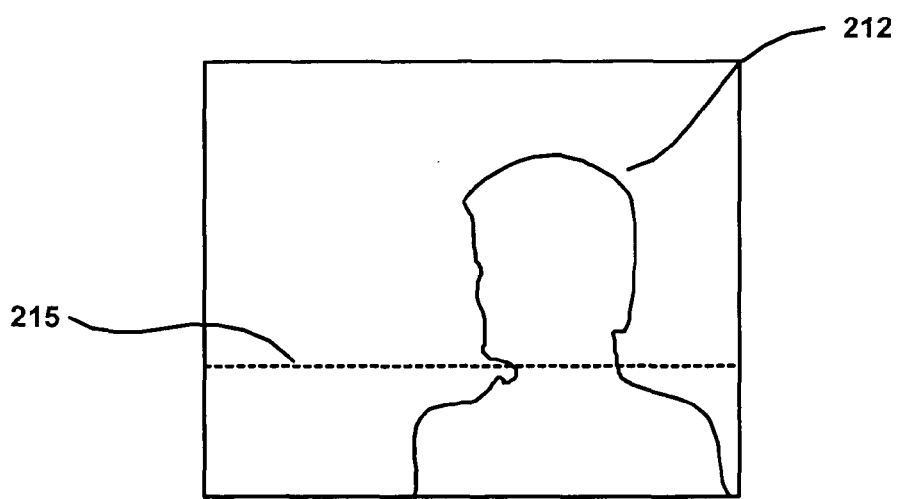
FIG. 2C is an illustration of an operation used for extracting a head contour from the silhouette of FIG. 2B, in accordance with one embodiment of the present invention.
Figure 2D:
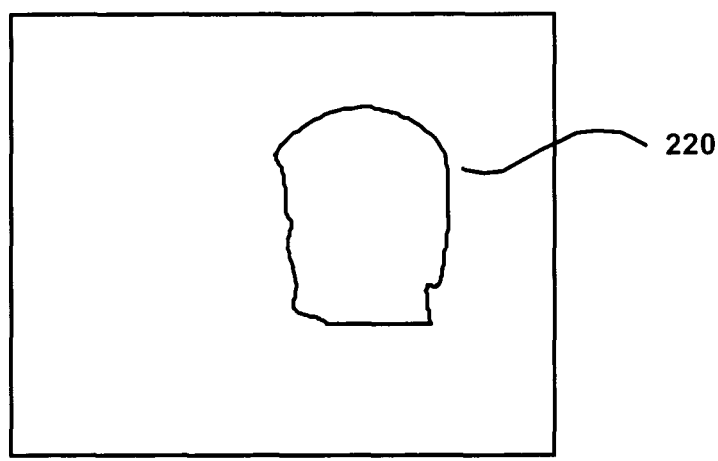
FIG. 2D is an illustration of an extracted head contour within the image of FIG. 2A, in accordance with one embodiment of the present invention.

FIGS. 2C and 2D are illustrations of operations used for extracting a head contour from the silhouette of FIG. 2B, in accordance with embodiments of the present invention. In FIG. 2C, the present embodiment performs a vertical threshold. The head and shoulder of the user is determined from the silhouette. That is, portions above the vertical threshold correspond to the head and shoulder. Line 215 is drawn across the contour 212 of the silhouette 210 and indicate the vertical threshold. Portions above the line 215 indicate the head and shoulder of the user 205. Various means for performing vertical threshold are known in the art of computer vision. As a result, in FIG. 2D, the present embodiment extracts the head contour 220 of the silhouette 210 of the user 205.

At 140, the present embodiment determines a location of the head of the user 205 within the 3D physical space from an elliptical model of the head. The location is based on the integration of the elliptical model, plurality of silhouettes and the plurality of head contours. That is, the head position is determined by going from 2D image space to 3D physical space. The present embodiment is able to provide estimations of the position of the head in real time. Head position is used to generate perspectively correct imagery for the user's viewpoint, in one embodiment. In another embodiment, the head position is used when animating a synthetic representation of the user (e.g., an avatar).

Figure 2E:
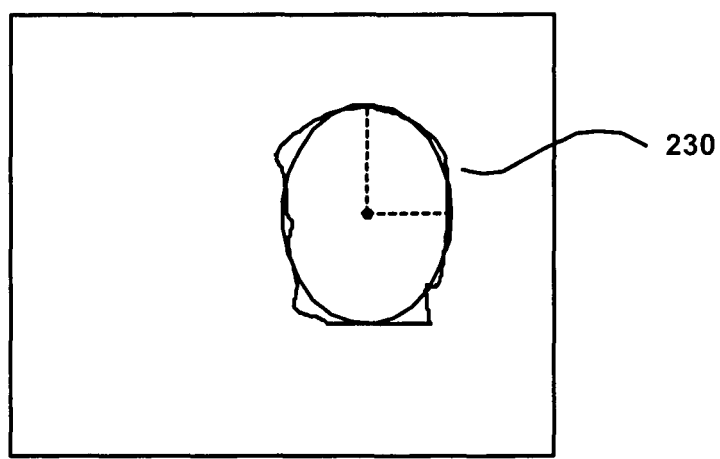
FIG. 2E is an illustration of the application of an ellipsoid to the head contour within the image of FIG. 2A, in accordance with one embodiment of the present invention.

For instance, FIG. 2E provides an illustration the application of an elliptical model 230 on the head contour 220 to partly determine the approximate position of the head of the user 205 within the 3D physical space.

Forward Method

Figure 3:
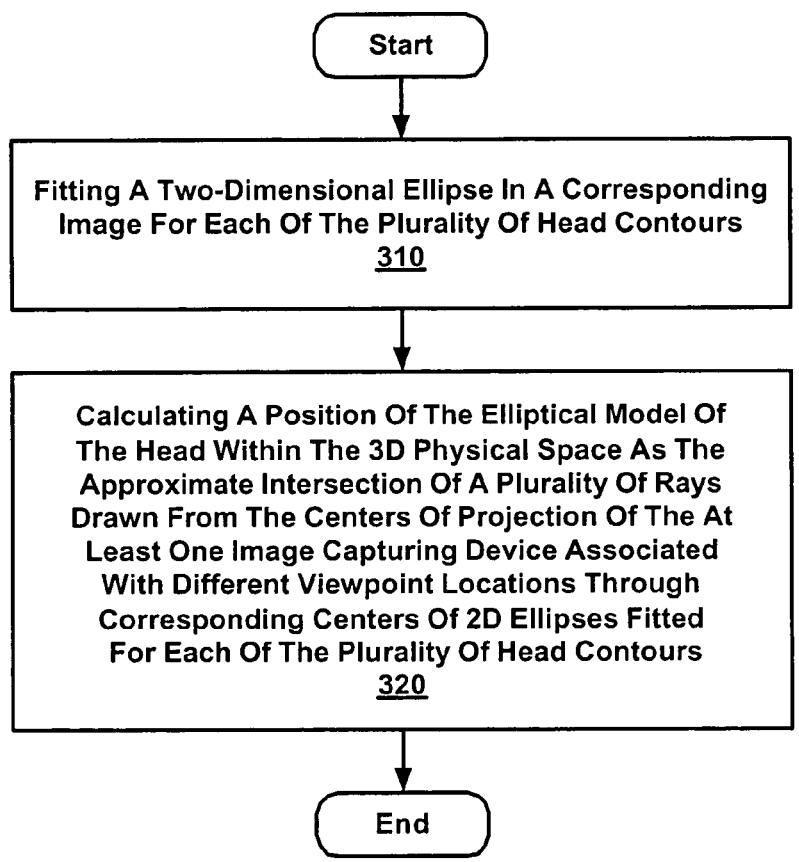
FIG. 3 is a flow chart illustrating steps in a computer implemented method for performing a forward estimation of the three dimensional position of an object in three dimensional space, in accordance with one embodiment of the present invention.
Figure 4:
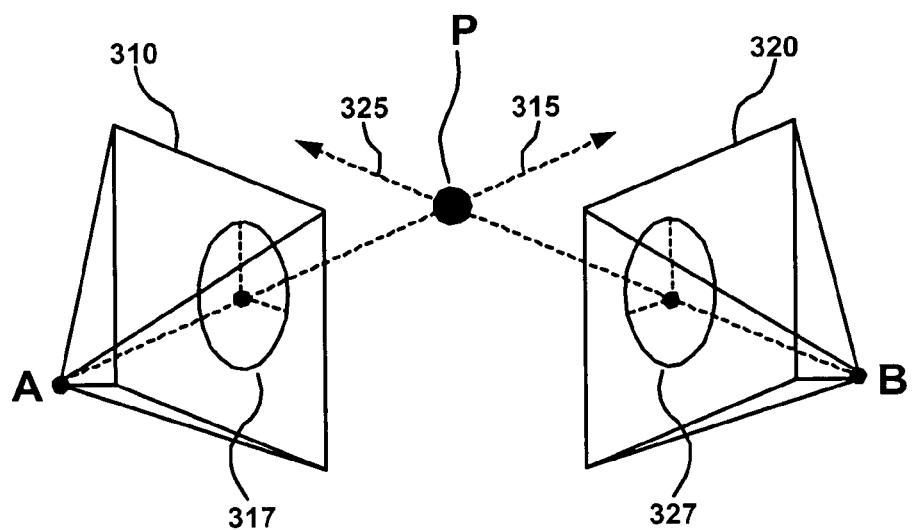
FIG. 4 is a diagram illustrating the implementation of a forward estimation of the three dimensional position of an object in three dimensional space, in accordance with one embodiment of the present invention.

FIGS. 3 and 4 provide illustrations for the forward method of estimating the three dimensional position of a head of a user in 3D physical space. FIG. 3 is a flow chart 300 illustrating steps in a computer implemented method for performing the forward estimation of the three dimensional position of the user's head. FIG. 4 is a diagram illustrating the determination of the 3D position from the forward projection of each of the 2D head contours out into the 3D physical space.

Referring now to FIG. 3, in one embodiment, the method of flow chart 300 further defines the method of flow chart 100 of FIG. 1. At 310, the present embodiment fits a two dimensional ellipse in a corresponding image for each of the plurality of head contours that were extracted from the flow chart 100 of FIG. 1. That is, a 2D ellipse is fitted independently to a corresponding head contour from the images taken of the user. The ellipse fitting can be accomplished by any method known in the art, for example, by robust linear re-weighted least-squares. For instance, FIG. 2E provides an illustration of fitting an ellipse to the head contour of the user in an image of the user.

At 320, the present embodiment calculates a position of a 3D elliptical model of the head within the 3D physical space. The position of the 3D elliptical model is determined as the approximate intersection of a plurality of rays that are drawn from the centers of projection of the image capturing devices through corresponding centers of the two-dimensional ellipses that are fitted for each of the plurality of head contours. The image capturing devices capture the images from different viewpoint locations.

FIG. 4 is an illustration of the process used to calculate a position of the 3D elliptical model of the head. In FIG. 4, two viewpoints of a user's head are provided. Point A and point B are the points from which the viewpoints of the user is taken. That is, point A represents the center of projection for the image capturing device (e.g., camera) taking the image of the user in image space 310 of the 3D physical space. Ellipse 317 is fitted to the head contour of the user extracted from the image of the user in image space 310. Ray 315 emanates from the camera with the center of projection at point A and passes through the center of the ellipse 317.

Point B represents the center of projection for the image capturing device (e.g., camera) taking the image of the user in image space 320 of the 3D physical space. Ellipse 327 is fitted to the head contour of the user extracted from the image of the user in image space 320. Ray 325 emanates from the camera with the center of projection at point B and passes through the center of the ellipse 327.

As such, the 3D head position of the user is estimated as the intersection at point P in FIG. 4 of all the rays emanating from the plurality of cameras taking images of the user and passing through the center of corresponding ellipses fitted to the head contours. Because the rays are unlikely to actually intersect at a point due to inaccuracies, any reasonable approximation to the intersection will do. For example, in one embodiment, the 3D point of closest approach to the rays is determined in a least-squares sense, as shown in FIG. 4.

In general, a 2D ellipse has four degrees of freedom: 2 for position and 2 for axis length, in one embodiment. In one embodiment, the ellipses are constrained to have major and minor axes aligned with the image coordinates. This reduces the number of unknown variables to four (two for position, two for axis length). These four degrees of freedom provide the position of the head of the user. In another embodiment, the axes of the ellipses are changed to provide additional degrees of freedom.

In addition, in one embodiment, by determining head location, realistic motion parallax in a 3D immersive telepresence system is accomplished. That is, the user can be placed into a 3D virtual environment, in which the user views on a regular monitor. When the user moves his or her head, the present embodiment is able to estimate the user's desired new viewpoint into the virtual world, and the rendering of the environment on the monitor is altered accordingly.

In other embodiments, five degrees of freedom are allowed. In one case, the fifth degree of freedom is orientation in addition to the four degrees (two for position, and two for axis length). That embodiment is able to determine the orientation of the head. For example, in one embodiment, face detection is performed (e.g., using a face detector) to determine the orientation of the head. In this manner, when the head of the user is rotated, the present embodiment is able to determine the new viewpoint of the user (e.g., as projected into a virtual world from the user's viewpoint of a corresponding 3D physical space). That is, the head position is used to generate perspectively-correct imagery for the user's viewpoint.

In one embodiment a rotation of the ellipse is allowed. That is, the ellipse can rotate away or tilt from a vertical orientation. However, it is still required that the projection of the ellipse's major axis onto the vertical image coordinate direction exceeds that of its projection onto the horizontal coordinate (i.e., the ellipse is no more than 45 degrees from vertical).

Backward Method

Figure 5:
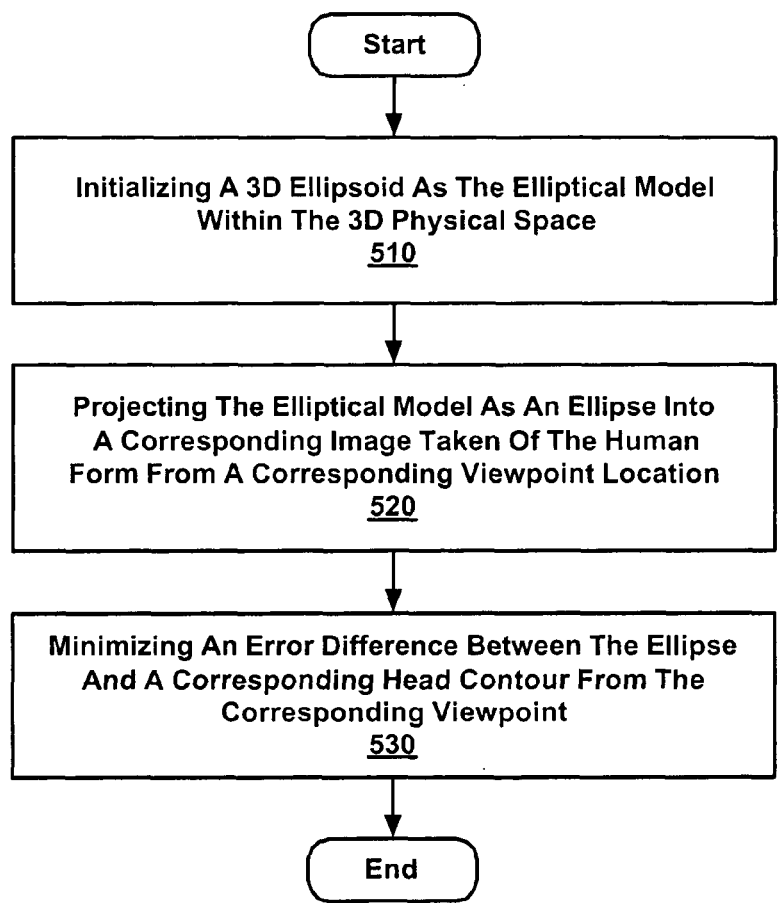
FIG. 5 is a flow chart illustrating steps in a computer implemented method for performing a backward estimation of the three dimensional position of an object in three dimensional space, in accordance with one embodiment of the present invention.
Figure 6:
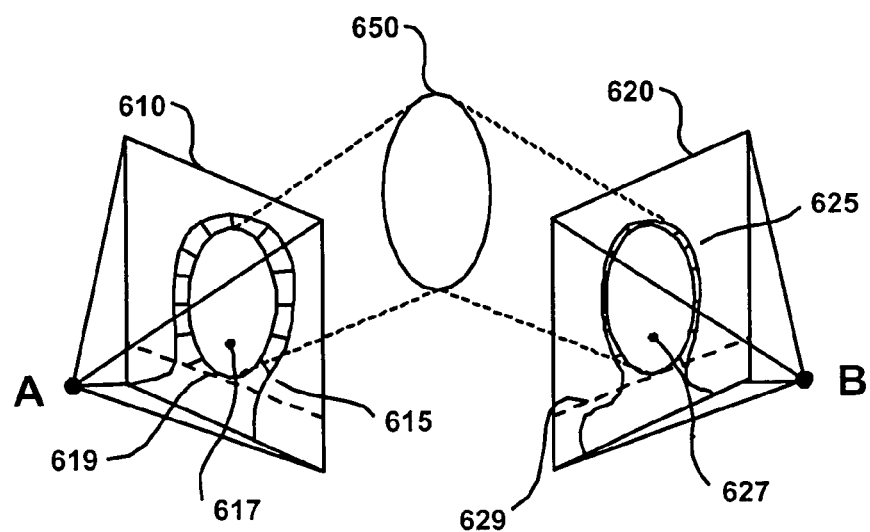
FIG. 6 is a diagram illustration the implementation of a backward estimation of the three dimensional position of an object in three dimensional space, in accordance with one embodiment of the present invention.

FIGS. 5 and 6 provide illustrations for the backward method of estimating the three dimensional position of a head of a user in 3D physical space. FIG. 5 is a flow chart 500 illustrating steps in a computer implemented method for performing the backward estimation of the three dimensional position of the user's head. FIG. 6 is a diagram illustrating the determination of the 3D position from the backward projection of a 3D elliptical model back to head contours in image space.

Referring now to FIG. 5, in one embodiment, the method of flow chart 500 further defines the method of flow chart 100 of FIG. 1. At 510, the present embodiment, for each of the plurality of viewpoint locations from which an image of the user is taken, initializes an ellipsoid (e.g., egg shape) as the 3D elliptical model of the user within the 3D physical space. More specifically, the elliptical model is placed at an estimated position within the 3D physical space that estimates the actual position of the user's head.

At 520, the present embodiment projects the elliptical model as an ellipse into a corresponding image taken of the user from a corresponding viewpoint location. This is accomplished for each of the images taken of the user from corresponding viewpoints.

At 530, the present embodiment minimizes an error difference between the ellipse and a corresponding head contour determined from a corresponding viewpoint. This error difference is minimized for each of the ellipses as back-projected onto a corresponding head contour. To minimize the error difference, the present embodiment determines an error criterion which sets the limit on whether the projections of the ellipsoid back into each image are "close to" the head contours. By minimizing the error criterion, a satisfactory estimate of the user's head position corresponding to the 3D position of the ellipsoid can be determined.

FIG. 6 is an illustration of the process used to calculate a position of the 3D elliptical model of the head using the backward method, in accordance with one embodiment of the present invention. In general, the elliptical model is determined in 3D by simultaneous nonlinear optimization of the back projection error into each camera. In FIG. 6, two viewpoints of a user's head are provided. Point A and point B are the points from which the viewpoints of the user is taken. That is, point A represents the center of projection for the image capturing device (e.g., camera) taking the image of the user in image space 610 of the 3D physical space. Point B represents the center of projection for the image capturing device (e.g., camera) taking the image of the user in image space 620 of the 3D physical space.

As shown in FIG. 6, the ellipsoid 650 is centered at a point P (hidden) in the 3D physical space. The ellipsoid is back-projected back into the images taken of the user. For instance, for the viewpoint taken at point A, the ellipsoid 650 is back projected as the ellipse 615 on the image of the user taken in image space 610. Also, for the viewpoint taken at point B, the ellipsoid 650 is back projected as the ellipse 625 into the image of the user taken in image space 620.

In the present embodiment, the error difference between each back projected ellipsoid into a head contour for each image of the user taken from a corresponding viewpoint is determined by summing the distance from each point on the head contour to a corresponding point on the back projected ellipsoid, or ellipse. Line 619 represents the bottom of the head contour 615, and line 629 represents the bottom of the head contour 625. The distance from each point on the head contour to the ellipsoid's projection is calculated, where the "distance" from a point to the projection is defined to be the minimum distance between the point and any point on the projection. FIG. 6 illustrates the error difference for various points on the head contour 615 to the ellipse 617, as well as the error difference for various points on the head contour 625 to the ellipse 627.

The head position is calculated as the position which minimizes the error difference for all the back projections of the ellipsoid back into head contours for each mage of the user taken from corresponding viewpoints. In a sense, the position which minimizes the area of the space between the head contours and their corresponding back-projected ellipsoids back into corresponding images is calculated as the position of the user's head.

In another embodiment, an alternative error criterion, which may typically be computed much more quickly, is calculated as follows: 1) back-project the ellipsoid into each image; 2) compute a weighted sum of either a) the absolute difference of the ellipsoid projection center and the centroid of the silhouette points, or b) the ellipsoid projection maximum width and the silhouette width at its centroid, or c) the ellipsoid projection maximum height and the silhouette height at its centroid. Still other error criteria are also compatible with the invention, in other embodiments of the present invention.

Figure 7:
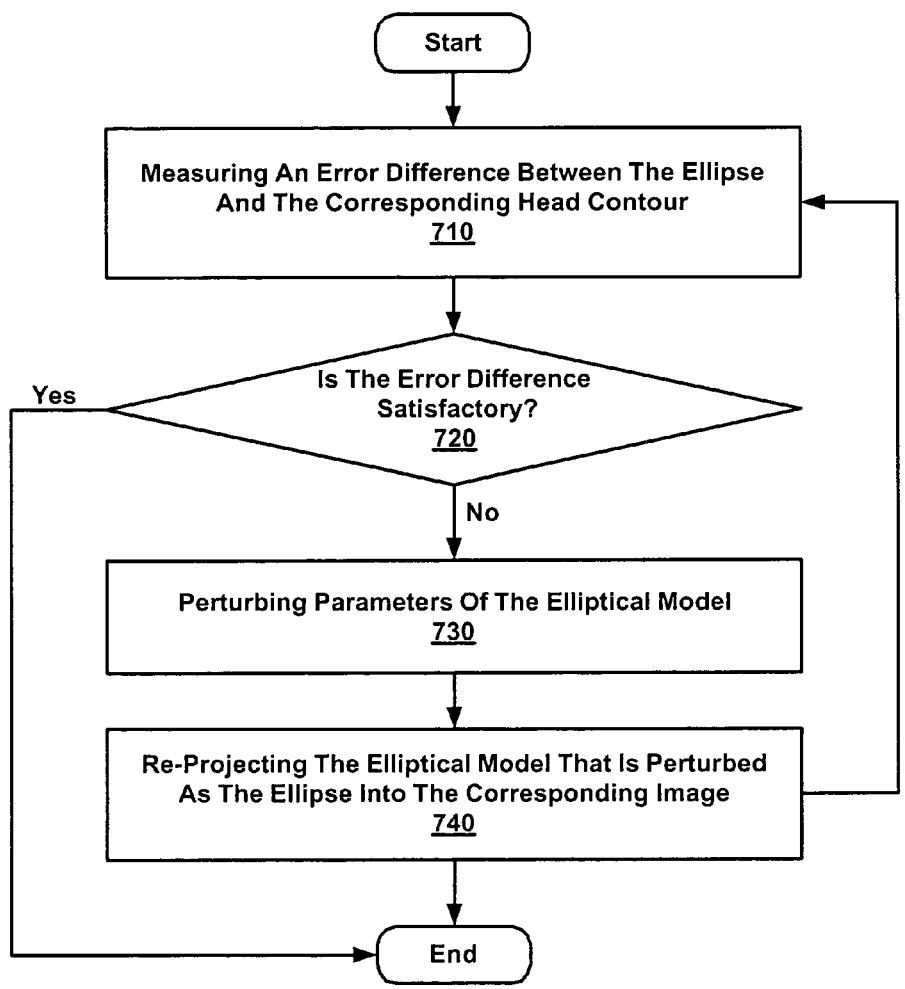
FIG. 7 is a flow chart illustrating steps in a computer implemented method for iteratively performing the backward estimation of the three dimensional position of an object in three dimensional space, in accordance with one embodiment of the present invention.

FIG. 7 is a flow chart 700 illustrating steps in a computer implemented method for minimizing an error difference as described in 530 of FIG. 5. That is, the method of flow chart 700 is a further illustration of 530. At 710, the present embodiment measures an error difference between a back projected ellipse and its corresponding head contour. This measurement of the error difference was previously described in relation to FIG. 6. At decision 720, the present embodiment determines if the error difference is satisfactory. If the error difference meets the error criterion, then the present embodiment ends. However, if the error difference does not meet the error criterion, then the present embodiment proceeds to 730.

At 730, the present embodiment perturbs parameters of the elliptical model. That is, the position of the elliptical model is changed. At 740, the present embodiment re-backprojects the elliptical model that is perturbed as ellipses into corresponding images. Then, the present embodiment iteratively returns to measuring an error difference at 710 until the error difference is satisfactory at 720.

For each new set of input frames from the cameras, initialization of the search for 3D ellipsoid parameters best minimizing the error criterion may be done in several ways. In some embodiments, the forward method previously described in FIG. 3 is used. That is, a plurality of 2D ellipses corresponding to the plurality of head contours is estimated. Then, a position of the position of the elliptical model of the head within the 3D physical space is calculated that corresponds to an approximate intersection of a plurality of rays drawn from the centers of projection of the image capturing devices that are associated with the different viewpoints of the user through corresponding centers of 2D ellipses fitted for the plurality of head contours.

In other embodiments, the best estimate from the previous frame set, if available, is used. In still other embodiments, the center and spatial extent of the visual hull created by the silhouettes, extracted from the different camera views, is used. Still other embodiments may use a combination of these and other initialization methods for each frame set, or may select different initialization methods for different frame sets. Also, when choosing among different initialization methods, metrics assessing the quality of each initialization method's output may be applied.

Combination of Forward and Backward Method

In one embodiment, estimations from the forward method are used in combination with the backward method. Separately, the forward method generates an independent solution for each frame, while the backward method provides an iterative process to narrow the estimations. As a result, the backward method provides better estimations than the forward method. Specifically, the standard deviation of the forward method estimates (8 mm in one implementation) is over twice the standard deviation of the estimates for the backward method (3 mm in one implementation).

However, the backward method requires a good initial estimate from the previous frame, or during initialization. As such, in the present embodiment, the forward method is used to initialize the backward method when a user first appears, or immediately after an unexpected failure. Thereafter, the present embodiment switches to the backward method for better performance.

In another embodiment, a simple adaptive filter is used to eliminate jitter when the user's head is motionless. The adaptive filter generally smoothes the positional estimate over time. The adaptive filter may have any or all of the following components: 1) infinite input response (IIR) temporal smoothing of positional estimates, 2) ignoring of positional estimates below some threshold magnitude, and 3) hysteresis to prevent adaptation to successive large changes in position estimates.

Extracting Head Contours from Silhouettes

As presented previously, the forward and backward methods use an extracted part of the silhouette known to correspond to the user's head. For example, the forward method estimates an empirical shoulder height, or vertical, threshold in each video frame, and the head contour is defined as all silhouette elements above the shoulder height threshold. Line 215 of FIG. 2C provides an illustration of the empirical vertical threshold.

In one embodiment, the shoulder height corresponding to the vertical threshold may be estimated as a fixed fraction (in one implementation, 25 percent) of the way up the vertical axis of the fitted ellipse from the previous frame. The vertical threshold estimation is heavily filtered (e.g., with a time constant in one implementation of approximately 1 second). In another embodiment, the vertical threshold can be initialized to a fixed number of pixels from the top of the silhouette when it first appears.

Figure 8A:
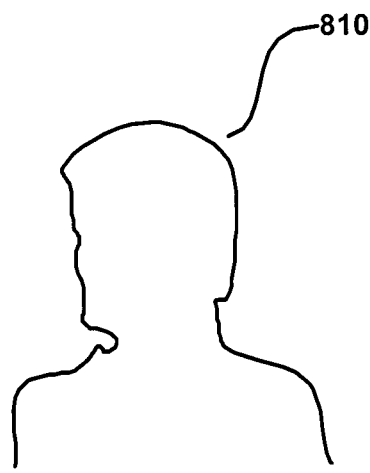
FIGS. 8A-D are illustrations of the extraction of a head contour by examining transitions of curvatures of a smoothed silhouette, in accordance with embodiments of the present invention.
Figure 8B:
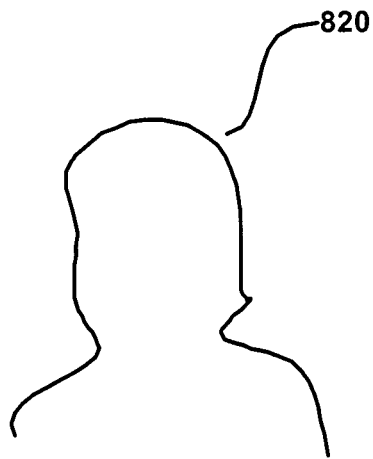

Alternatively, extraction of the head portion of the silhouette from the remainder of the body may be done by other methods. For instance, FIGS. 8A, 8B, 8C, and 8D provide illustrations of a method for estimating the neck curvature from a silhouette of a body by examining transitions within the silhouette. FIG. 8A provides an outline 810 of a silhouette of a user. The silhouette 810 can be extracted from raw video as is shown by FIG. 2B. FIG. 8B provides a smoothed 2D curvature 820 of the outline 810 of FIG. 8A.

Figure 8C:
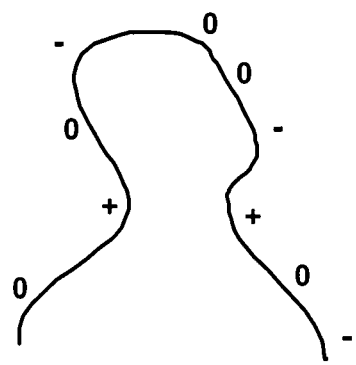
Figure 8D:
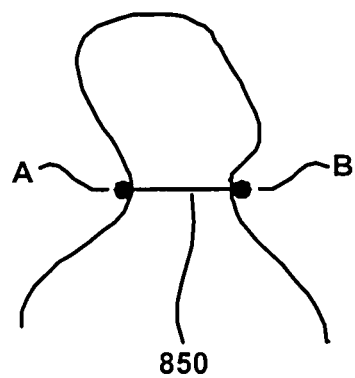

As shown in FIG. 8C, the smoothed 2D curvature 820 is examined to determine the position of the neck by identifying the neck curvature. Specifically, starting from the uppermost point on the smoothed 2D curvature 820, curvatures in the smoothed silhouette are examined for positive and negative transitions. That is, changes in the local slope are measured. FIG. 8D illustrates two points A and B of positive transitions that most likely indicate the starting locations of the neck of the user. The line 850 is drawn between points A and B to indicate the neck curvature.

In still another embodiment, one or more 2D curve templates representative of typical head-and-shoulder profiles may be fitted to the silhouette. Fitting may be implemented by scaling, translating, and rotating the template until it best matches the silhouette. This may be accomplished on one or more templates to determine the best fit of a plurality of two dimensional head and shoulder templates to a corresponding silhouette. Thereafter a head position is identified from the selected two dimensional head and shoulder template. For instance, the head portion of the silhouette is determined from the template labeling. Still other methods of identifying the portion of the silhouette corresponding to the head are also compatible with the present invention.

Figure 9:
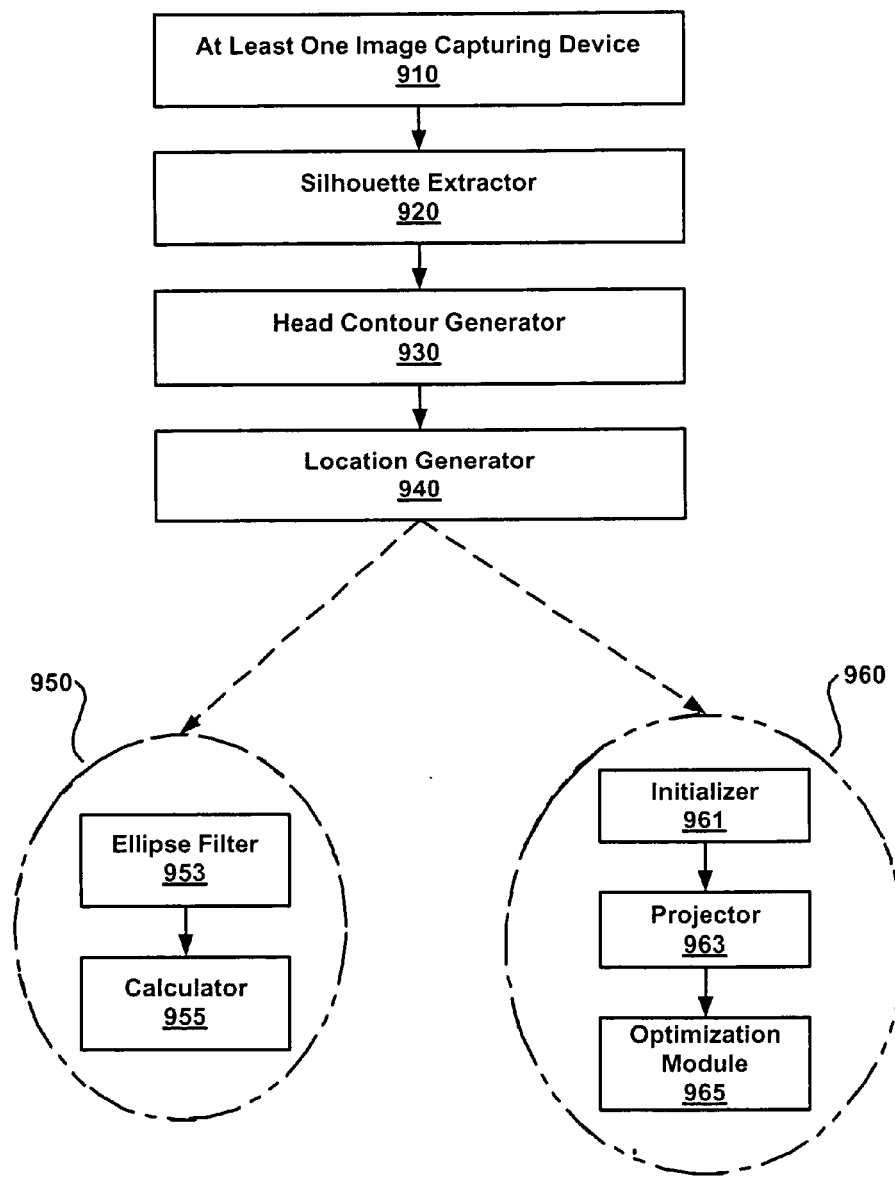
FIG. 9 is a block diagram of a system for estimating the three dimensional position of an object, in accordance with one embodiment of the present invention.

FIG. 9 is a block diagram of a system 900 for estimating the three dimensional position of an object, in accordance with one embodiment of the present invention. In one embodiment, a desktop computer and five relatively inexpensive image capturing devices (e.g., FireWire cameras) are used for system 900. The system comprises at least one image capturing device 910 for capturing a plurality of images of a human form within a three dimensional (3D) physical space. Each of the plurality of images is captured from a plurality of different viewpoint locations of the human form. A silhouette extractor 920 is coupled to the image capturing device 910. The silhouette extractor 920 extracts a plurality of silhouettes of the human form from the plurality of images. A head contour generator 930 is coupled to the silhouette extractor 920. The head contour generator 930 obtains a plurality of head contours of a head of the human form from the plurality of silhouettes. A location generator 940 is coupled to the head contour generator 930. The location generator 940 determines a location of the head within the 3D physical space from an elliptical model of the head based on the plurality of head contours.

As shown in FIG. 9, the system 900 can perform both the forward estimation as provided in FIG. 3 and the backward estimation as provided in FIG. 5 of a position of a user's head within 3D space. Specifically, the location generator 940 can employ both these estimation methods to calculate the position. As such, the location generator further comprises module 950 for performing the forward estimation, and a module 960 for performing the backward estimation of the position of the user's head.

The module 950 comprises an ellipse fitter 953 that fits a 2D ellipse in a corresponding image for each of the plurality of head contours. The module 950 also comprises a calculator 955 for calculating a position of the elliptical model of the head within the 3D physical space. The position corresponds to an approximate intersection of a plurality of rays drawn from the centers of projection of the image capturing devices that are associated with the different viewpoints of the user through corresponding centers of 2D ellipses fitted for the plurality of head contours obtained from the images.

The module 960 comprises an initializor 961 that initializes a 3D ellipsoid as the elliptical model within the 3D physical space. A projector 963 is coupled to the initializor 961 and projects the elliptical model as an ellipse into a corresponding image taken of the human form from a corresponding viewpoint location. An optimization module 965 is coupled to the projector 963 and minimizes an error difference between the ellipse and a corresponding head contour from the corresponding viewpoint. The optimization module further comprises a measuring module for measuring an error difference between the ellipse and the corresponding head contour, a comparator for determining if the error difference is satisfactory, an elliptical model generator for perturbing parameters of the elliptical model, the projector for re-projecting the elliptical model that is perturbed as the ellipse into the corresponding image; an iteration module for iteratively returning to the measurer until the error difference is satisfactory.

Accordingly, embodiments of the present invention provide a method and system for estimating the position of a user's head in 3D space. Specifically, embodiments of the present invention have certain advantages over other systems. For instance, embodiments of the present invention do not require markers or other alterations to a user's head. The system of the invention passively interacts with the user to determine the position of the user's head. Embodiments of the present invention are more accurate than other systems. For instance, in one embodiment, the head centroid is localized to an accuracy of 3-8 mm. Embodiments of the present invention operate with computational efficiency. Other embodiments are able to provide real-time estimations. Still other embodiments are more robust than other systems because of the use of silhouettes and a very simple head model (an ellipse or ellipsoid). As such, embodiments of the present invention are not vulnerable to changes in lighting, the appearance and disappearance of the user, difficulties in finding features that can be tracked reliably, inaccuracies in forming an explicit 3D model of the user's head, and problems with inaccurate calculation of optical flow and/or texture registration.

While the methods of embodiments illustrated in flow charts 100, 300, 500, and 700 show specific sequences and quantities of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A method and system for estimating the three dimensional position of an object in a three dimensional physical space is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for estimating the three dimensional position of an object, comprising:
    capturing a plurality of images of a human form within a three dimensional (3D) physical space in a manner that does not require said human form to be close to a frontal position during said capturing of said plurality of images, each of said plurality of images captured from a different viewpoint location of said human form using at least one image capturing device calibrated within said 3D physical space, each of said plurality of images is of said human form not in a frontal position;
    extracting a plurality of silhouettes of said human form from said plurality of images, wherein each of said plurality of silhouettes is from said at least one of said plurality of images of said human form not in said frontal position;
    obtaining a plurality of contours of an object of said human form from said plurality of silhouettes, wherein a contour of said plurality of contours corresponds to at least a portion of said human form and wherein at least one of said contours is not an elliptical shape; and
    determining a location of said object within said 3D physical space using an object model of said object based on said plurality of contours, wherein said determining a location comprises:
        projecting said object model as an ellipse into a corresponding image taken of said human form from a corresponding viewpoint's location; and
        minimizing an error difference between said ellipse and a corresponding contour of said object from said corresponding viewpoint, wherein said minimizing an error different comprises:
            measuring said error difference between said ellipse and said corresponding contour.

2. The method of claim 1, wherein said object comprises a head.

3. The method of claim 1, wherein said extracting a plurality of silhouettes comprises:
    performing background removal on each of said plurality of images.

4. The method of claim 1, wherein said determining a location comprises:
    fitting a two-dimensional ellipse in a corresponding image for each of said plurality of contours; and
    calculating a position of said object model of said object within said 3D physical space as the approximate intersection of a plurality of rays drawn from the centers of projection of said at least one image capturing device associated with different viewpoint locations through corresponding centers of 2D ellipses fitted for each of said plurality of contours.

5. The method of claim 4, further comprising:
    performing face detection to determine said orientation of said head.

6. The method of claim 1, further comprising:
    performing a vertical threshold on each of said plurality of silhouettes prior to said obtaining a plurality of contours of an object of said human for from said plurality of silhouettes, wherein said vertical threshold removes a portion of each of said plurality of silhouettes below said vertical threshold.

7. The method of claim 1, wherein said determining a location further comprises:
   initializing a 3D ellipsoid as said object model within said 3D physical space.

8. The method of claim 7, wherein said initializing a 3D ellipsoid further comprises:
   estimating a plurality of 2D ellipses corresponding to said plurality of contours; and
   calculating a position of said object model as said 3D ellipsoid of said head within said 3D physical space as the approximate intersection of a plurality of rays drawn from the centers of projection of said at least one image capturing device associated with different viewpoint locations through corresponding centers of 2D ellipses fitted for each of said plurality of contours.

9. The method of claim 7, wherein said minimizing an error difference further comprises:
   determining if said error difference is satisfactory; perturbing parameters of said object model;
   re-projecting said object model that is perturbed as said ellipse into said corresponding image; and
   iteratively returning to said measuring an error difference until said error difference is satisfactory.

10. The method of claim 1, wherein said determining a location comprises:
    varying a location of an elliptical model of fixed size as said object model.

11. The method of claim 1, wherein said determining a location comprises:
    varying the sizes of axes of said object model.

12. The method of claim 2, wherein said obtaining a plurality of contours further comprises:
    determining a starting location of a neck of a corresponding contour of said head by identifying transitions of curvatures of a corresponding silhouette.

13. A system for estimating the three dimensional position of an object, comprising:
    at least one image capturing device for capturing a plurality of images of a human form within a three dimensional (3D) physical space, each of said plurality of images captured from a different viewpoint location of said human form using said at least one image capturing device calibrated within said 3D physical space in a manner that does not require said human form to be close to a frontal position during said capturing of said plurality of images, each of said plurality of images is of said human form not in a frontal position; and
    a processor to:
    extract a plurality of silhouettes of said human form from said plurality of images, each of said plurality of silhouettes is from said at least one of said plurality of images of said human form not in said frontal position;
    obtain a plurality of head contours of a head of said human form from said plurality of silhouettes, wherein a contour of said plurality of contours corresponds to at least a portion of said human form and at least one of said contours is not an elliptical shape;
    determine a location of said head within said 3D physical space using an elliptical model of said head based on said plurality of head contours;
    project said elliptical model as an ellipse into a corresponding image taken of said human form from a corresponding viewpoint's location;
    minimize an error difference between said ellipse and a corresponding head contour from said corresponding viewpoint; and
    measure said error difference between said ellipse and said corresponding head contour.

14. The system of claim 13, wherein the processor is to:
    fit a two-dimensional ellipse in a corresponding image for each of said plurality of head contours; and
    calculate a position of said elliptical model of said head within said 3D physical space as the approximate intersection of a plurality of rays drawn from the centers of projection of said at least one image capturing device associated with different viewpoint locations through corresponding centers of 2D ellipses fitted for each of said plurality of head contours.

15. The system of claim 13, wherein the processor is to:
    initialize a 3D ellipsoid as said elliptical model within said 3D physical space.

16. The system of claim 15, wherein the processor is to:
    determine if said error difference is satisfactory;
    perturb parameters of said elliptical model;
    re-project said elliptical model that is perturbed as said ellipse into said corresponding image; and
    iteratively return to said measurer until said error difference is satisfactory.

17. A computer system comprising:
    a processor;
    a bus coupled to said processor; and
    a non-transitory computer-readable storage medium coupled to said bus containing instructions that when implemented cause said processor to implement a method for estimating the three dimensional position of an object, comprising:
    capturing a plurality of images of a human form within a three dimensional (3D) physical space in a manner that does not require said human form to be close to a frontal position during said capturing of said plurality of images, each of said plurality of images captured from a different viewpoint location of said human form using at least one image capturing device calibrated within said 3D physical space, each of said plurality of images is of said human form not in a frontal position;
    extracting a plurality of silhouettes of said human form from said plurality of images, wherein each of said plurality of silhouettes is from said at least one of said plurality of images of said human form not in said frontal position;
    obtaining a plurality of contours of an object of said human form from said plurality of silhouettes, wherein a contour of said plurality of contours corresponds to at least a portion of said human form and wherein at least one of said contours is not an elliptical shape; and
    determining a location of said object within said 3D physical space using an object model of said object based on said plurality of contours, wherein said determining a location comprises:
    projecting said object model as an ellipse into a corresponding image taken of said human form from a corresponding viewpoint's location; and
    minimizing an error difference between said ellipse and a corresponding contour of said object from said corresponding viewpoint, wherein said minimizing an error different comprises:
    measuring said error difference between said ellipse and said corresponding contour.

18. The computer system of claim 17, wherein said object comprises a head.

19. The computer system of claim 17, wherein said extracting a plurality of silhouettes in said method further comprises instructions comprising:
performing background removal on each of said plurality of images.

20. The computer system of claim 17, wherein said determining a location in said method further comprises instructions comprising:
fitting a two-dimensional ellipse in a corresponding image for each of said plurality of head contours; and
calculating a position of said elliptical model of said head within said 3D physical space as the approximate intersection of a plurality of rays drawn from the centers of projection of said at least one image capturing device associated with different viewpoint locations through corresponding centers of 2D ellipses fitted for each of said plurality of head contours.

21. The computer system of claim 17, wherein said method further comprises instructions comprising:
determining an orientation of said head.

22. The computer system of claim 21, wherein said method further comprises instructions comprising:
performing face detection to determine said orientation of said head.

23. The computer system of claim 17, wherein said determining a location in said method further comprises instructions comprising:
initializing a 3D ellipsoid as said object model within said 3D physical space.

24. The computer system of claim 23, wherein said initializing a 3D ellipsoid in said method further comprises instructions comprising:
estimating a plurality of 2D ellipses corresponding to said plurality of contours; and
calculating a position of said object model as said 3D ellipsoid of said head within said 3D physical space as the approximate intersection of a plurality of rays drawn from the centers of projection of said at least one image capturing device associated with different viewpoint locations through corresponding centers of 2D ellipses fitted for each of said plurality of contours.

25. The computer system of claim 23, wherein said minimizing an error difference in said method further comprises instructions comprising:
determining if said error difference is satisfactory;
perturbing parameters of said object model;
re-projecting said object model that is perturbed as said ellipse into said corresponding image; and
iteratively returning to said measuring an error difference until said error difference is satisfactory.

26. The computer system of claim 17, wherein said determining a location in said method further comprises instructions comprising:
varying a location of an elliptical model of fixed size as said object model.

27. The computer system of claim 17, wherein said determining a location in said method further comprises instructions comprising:
varying the sizes of axes of said object model.

28. The computer system of claim 18, wherein said obtaining a plurality of contours in said method further comprises instructions comprising:
determining the best fit of a two dimensional head and shoulder template to a corresponding silhouette; and
identifying a head portion of the selected two dimensional head and shoulder template.

29. A non-transitory computer-readable storage medium containing program instructions that implement a method for estimating the three dimensional position of an object, comprising:
capturing a plurality of images of a human form within a three dimensional (3D) physical space in a manner that does not require said human form to be close to a frontal position during said capturing of said plurality of images, each of said plurality of images captured from a different viewpoint location of said human form using at least one image capturing device calibrated within said 3D physical space, each of said plurality of images is of said human form not in a frontal position;
extracting a plurality of silhouettes of said human form from said plurality of images, wherein each of said plurality of silhouettes is from at least one of said plurality of images of said human form not in said frontal position;
obtaining a plurality of head contours of a head of said human form from said plurality of silhouettes, wherein a contour of said plurality of contours corresponds to at least a portion of said human form and wherein at least one of said contours is not an elliptical shape;
determining a location of said object within said 3D physical space using an object model of said object based on said plurality of contours, wherein said determining a location comprises:
projecting said object model as an ellipse into a corresponding image taken of said human form from a corresponding viewpoint's location; and
minimizing an error difference between said ellipse and a corresponding contour of said object from said corresponding viewpoint, wherein said minimizing an error different comprises:
measuring said error difference between said ellipse and said corresponding contour.

30. The non-transitory computer-readable storage medium of claim 29, wherein said determining a location further comprises instructions for performing:
fitting a two-dimensional ellipse in a corresponding image for each of said plurality of head contours; and
calculating a position of said elliptical model of said head within said 3D physical space as the approximate intersection of a plurality of rays drawn from the centers of projection of said at least one image capturing device associated with different viewpoint locations through corresponding centers of 2D ellipses fitted for each of said plurality of head contours.

31. The non-transitory computer-readable storage medium of claim 29, wherein said determining an orientation of said head further comprises instructions for performing:
initializing a 3D ellipsoid as said elliptical model within said 3D physical space.

32. The non-transitory computer-readable storage medium of claim 31, wherein said initializing a 3D ellipsoid further comprises instructions for performing:
estimating a plurality of 2D ellipses corresponding to said plurality of head contours; and
calculating a position of said elliptical model of said head within said 3D physical space as the approximate intersection of a plurality of rays drawn from the centers of projection of said at least one image capturing device associated with different viewpoint locations through corresponding centers of 2D ellipses fitted for each of said plurality of head contours.

33. The non-transitory computer-readable storage medium of claim 31, wherein said minimizing an error difference further comprises instructions for performing:
  determining if said error difference is satisfactory; perturbing parameters of said elliptical model;
  re-projecting said elliptical model that is perturbed as said ellipse into said corresponding image; and
  iteratively returning to said measuring an error difference until said error difference is satisfactory.

* * * * *